United States Patent
Ahmadi

(10) Patent No.: US 9,445,408 B2
(45) Date of Patent: *Sep. 13, 2016

(54) DISTRIBUTED COMPUTING IN A WIRELESS COMMUNICATION SYSTEM

(71) Applicant: Apple Inc., Cupertino, CA (US)

(72) Inventor: Sassan Ahmadi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,145

(22) Filed: Jan. 7, 2015

(65) Prior Publication Data

US 2015/0120942 A1 Apr. 30, 2015

Related U.S. Application Data

(63) Continuation of application No. 13/564,759, filed on Aug. 2, 2012, now Pat. No. 8,942,715.

(51) Int. Cl.
| | |
|---|---|
| *H04W 72/00* | (2009.01) |
| *H04W 72/04* | (2009.01) |
| *H04L 12/911* | (2013.01) |
| *H04W 64/00* | (2009.01) |
| *H04W 76/02* | (2009.01) |
| *G06F 9/50* | (2006.01) |

(52) U.S. Cl.
CPC ........ *H04W 72/0413* (2013.01); *G06F 9/5027* (2013.01); *H04L 47/70* (2013.01); *H04W 64/003* (2013.01); *H04W 76/023* (2013.01); *Y02B 60/142* (2013.01)

(58) Field of Classification Search
CPC .......... H04L 12/2803; H04L 12/2827; H04L 2012/2849; H04L 63/1408; H04L 67/325; H04W 72/0406; H04W 72/04; H04W 76/02; H04W 84/042; H04W 84/047

USPC .................. 455/452.1, 452.2, 451, 450, 509; 709/226, 229, 224

See application file for complete search history.

(56) References Cited

U.S. PATENT DOCUMENTS

| | | | | |
|---|---|---|---|---|
| 7,277,711 | B2 * | 10/2007 | Nyu | H04W 4/20 455/404.2 |
| 7,400,856 | B2 * | 7/2008 | Sartori | H04B 7/2606 370/315 |
| 7,406,310 | B2 * | 7/2008 | Okita | G06F 8/65 455/418 |
| 8,081,961 | B2 * | 12/2011 | Okita | G06F 8/65 455/418 |
| 8,204,505 | B2 * | 6/2012 | Jin | H04W 72/0406 455/450 |
| 8,559,908 | B2 * | 10/2013 | Sun | H04W 16/10 455/403 |
| 8,611,217 | B2 * | 12/2013 | Kotecha | H04L 47/14 370/230.1 |
| 2002/0062376 | A1 * | 5/2002 | Isoyama | H04L 29/06 709/226 |
| 2005/0165925 | A1 * | 7/2005 | Dan | G06F 9/5083 709/224 |
| 2007/0021116 | A1 * | 1/2007 | Okita | G06F 8/65 455/428 |

(Continued)

*Primary Examiner* — Ankur Jain
(74) *Attorney, Agent, or Firm* — Meyertons Hood Kivlin Kowert & Goetzel, P.C.; Jeffrey C. Hood; Joel L. Stevens

(57) ABSTRACT

Distributed computing in a wireless communication system. Reports may be received from a plurality of nodes in a wireless communication system. Each respective report may include information regarding computing resources at the respective node. A notification of a request for a computing resource may be received from a first wireless user equipment device. A first node may be selected from the plurality of nodes to provide the computing resource based on the reports received from the plurality of nodes. The first node may be assigned to provide the computing resource.

20 Claims, 9 Drawing Sheets

(56) References Cited

U.S. PATENT DOCUMENTS

| | | |
|---|---|---|
| 2008/0165727 A1 | 7/2008 | Xiaoben et al. |
| 2008/0233943 A1* | 9/2008 | Okita .................. G06F 8/65 |
| | | 455/419 |
| 2009/0310554 A1* | 12/2009 | Sun ..................... H04W 16/10 |
| | | 370/329 |
| 2010/0050172 A1 | 2/2010 | Ferris |
| 2011/0202657 A1 | 8/2011 | Chang |
| 2011/0320606 A1 | 12/2011 | Madduri et al. |
| 2012/0093145 A1* | 4/2012 | Anchan ................ H04W 28/24 |
| | | 370/352 |
| 2012/0173729 A1 | 7/2012 | Lee et al. |
| 2012/0218892 A1* | 8/2012 | Kotecha ............... H04L 47/14 |
| | | 370/235 |
| 2013/0286942 A1* | 10/2013 | Bonar ................. H04B 7/0689 |
| | | 370/328 |

* cited by examiner

DISTRIBUTED COMPUTING IN A WIRELESS COMMUNICATION SYSTEM

PRIORITY INFORMATION

This application is a continuation of U.S. patent application Ser. No. 13/564,759, entitled "Distributed Computing in a Wireless Communication System", filed Aug. 2, 2012, to which priority is claimed.

FIELD

The present application relates to wireless devices, and more particularly to a system and method for distributed computing in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Increasing demand for such wireless multimedia applications and Internet-based services has led to increased complexity and power consumption of the application processors of wireless devices and has required more processing power. This increasing complexity and processing power comes with a price in terms of research, design, and manufacturing costs to create ever more powerful wireless devices. At the same time, the increased power consumption either requires further research, design, and manufacturing costs for improved batteries, or a tradeoff in battery life in exchange for better performance. Accordingly, improvements in wireless devices would be desirable.

SUMMARY

In light of the foregoing and other concerns, it would be desirable to provide a way for a wireless device to support the full extent of possible high-quality services and applications for mobile users without requiring higher application processing power and its associated costs at the wireless device. One embodiment of the invention relates to a system and method for distributed processing in a wireless communication system. This system and method may advantageously make efficient use of network application processing power and reduce the processing burden on wireless devices. Such a system may shift certain processing tasks relating to services or applications provided to a wireless device away from the wireless device and instead to another node which is communicatively coupled to the wireless device via the wireless communication system.

Thus in some embodiments, if a user of a wireless device initiates an application or service on the wireless device, instead of performing all of the computing (e.g., processing) required for the application or service, one or more computing tasks associated with the application or service may be assigned to another node to which the wireless device is communicatively coupled via a wireless communication system.

For example, consider a case in which a user initiates a video streaming service on a wireless device over a wireless link with an access point which provides a connection to a network. The user might request some form of post-processing on the video stream (e.g., image enlargement, smoothing, video enhancements, etc). The wireless device might then request that the post-processing be performed by another node in the network on behalf of the wireless device. A node (which might be the access point, another access point, a relay station, another mobile station, a base station, etc.) might then be assigned to perform the requested post-processing, and pass on the post-processed content to the wireless device.

Note that any number of other computing functions (e.g., other types of processing, memory/storage usage, etc.) may be distributed in conjunction with any number of applications and services in a similar manner. Thus, the computing resources of the various nodes in the wireless communication system may be shared for data/application processing on behalf of wireless devices in order to alleviate the need for more processing power at each individual wireless device. This may consequently reduce the overall complexity, cost, and power consumption of the wireless devices, and may result in more efficient sharing of not only radio resources but also processing (and memory) resources in a network.

Such a technique may be advantageously facilitated by providing a network entity capable of tracking network resources on an instantaneous or nearly instantaneous basis. Such an entity may be able to use high-quality information on available computing resources, network topography, communication link characteristics, and/or information (e.g., QoS requirements) relating to services and applications for which computing resources may be requested, among other possible information, in order to select nodes for providing requested computing resources in a manner that makes efficient use of network computing resources and communication bandwidth while providing high-quality services and applications to end-users. Furthermore, such an entity may be capable of rapidly reacting to changes in network conditions to adjust and/or re-assign computing tasks among computing resources in the network, e.g., based on wireless device handover between base stations, variable channel conditions for wireless and/or wired connections, nodes joining or leaving the network, etc.

Accordingly, embodiments are presented herein of a method for distributed computing in a wireless communication system and various devices (such as a wireless user equipment (UE) device, a base station (BS), a computer system, and/or other devices) configured to implement part or all of the method. Devices may include one or more radios, including one or more antennas, for performing wireless communications. Devices may also include device logic (which may include a processor and memory medium and/or hardware logic) configured to implement part or all of the method. Embodiments are also presented of a memory medium (e.g., a non-transitory computer accessible memory medium) comprising program instructions executable by a processor to perform part or all of the method.

BRIEF DESCRIPTION OF THE DRAWINGS

A better understanding of the present embodiments can be obtained when the following detailed description of the preferred embodiment is considered in conjunction with the following drawings, in which.

Figure 1:
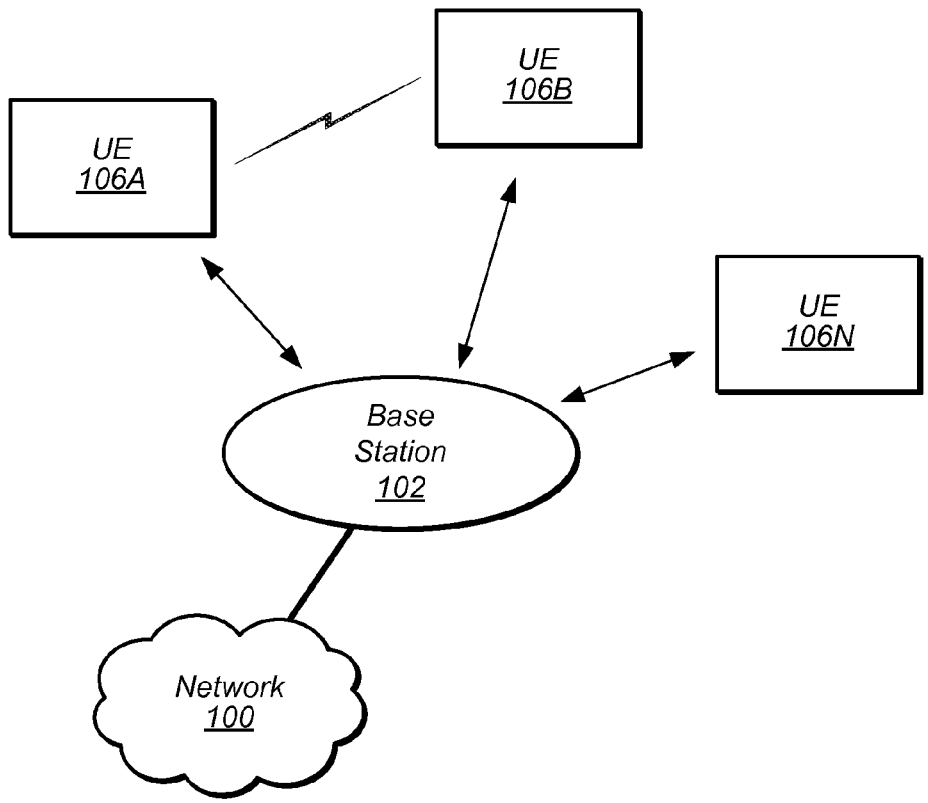
FIG. 1 illustrates an exemplary (and simplified) wireless communication system.

While embodiments described herein susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
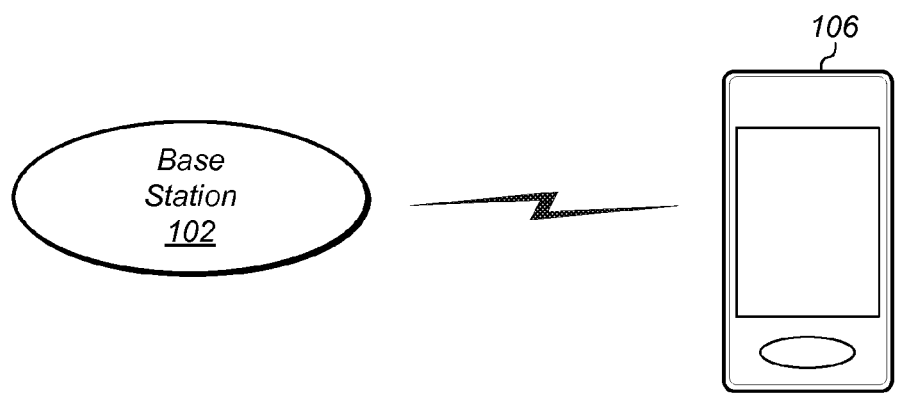
FIG. 2 illustrates a base station in communication with user equipment.

FIGS. 1-2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices are referred to as UEs or UE devices.

The base station 102 may be a base transceiver station (BTS) or cell site, and may include hardware that enables wireless communication with the UEs 106A through 106N according to a cellular communication protocol. Alternatively, the base station 102 may be an access point providing a wireless local area network (WLAN). The base station 102 may be equipped to communicate with a network 100, such as a cellular service provider's network and/or the Internet. Thus, the base station 102 may facilitate communication between the UEs and/or between the UEs and the network 100. The base station 102 and the UEs may be configured to communicate over the transmission medium using any of various wireless communication technologies such as GSM, CDMA, WLL, WAN, WiFi, WiMAX, etc.

As shown, in some embodiments multiple UEs 106 may be configured to communicate directly with each other, e.g., using a peer-to-peer wireless communication protocol. For example, Bluetooth ("BT", including BT low energy ("BLE"), Alternate MAC/PHY ("AMP"), and/or other BT versions or features), Wi-Fi ad-hoc/peer-to-peer, and/or any other peer-to-peer wireless communication protocol (e.g., a variation of a cellular communication protocol designed for peer-to-peer communication) may be used to facilitate direct communications between two UEs 106, according to some embodiments.

In some embodiments, UE 106 may be capable of communicating using multiple wireless communication standards. For example, in some embodiments, the UE 106 may be configured to communicate using at least one peer-to-peer wireless communication protocol (e.g., BT, Wi-Fi peer-to-peer, etc.) and at least one cellular communication protocol (e.g., UMTS, LTE, 1×RTT, etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE may include a processor that is configured to execute program instructions stored in memory. The UE may perform some or all of the methods described herein by executing such stored instructions. In some embodiments, the UE may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication protocols. For example, the UE 106 may be configured to communicate using one or more of GSM, UMTS, CDMA 2000, LTE, WiMAX, WLAN, or BT. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards; in other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT, and separate radios for communicating using each of Wi-Fi and Bluetooth. Other configurations are also possible.

In some embodiments, the UE 106 and the BS 102 may each be considered nodes in a wireless communication system. In some embodiments, the wireless communication system may also include any number of other nodes, which may include other BSs and UEs, networking appliances, computing systems, and/or other resources. The wireless communication system may include wireless connections between at least some nodes (e.g., between BS 102 and UE 106), and may also include wired connections between some nodes, at least in some embodiments.

Figure 3:
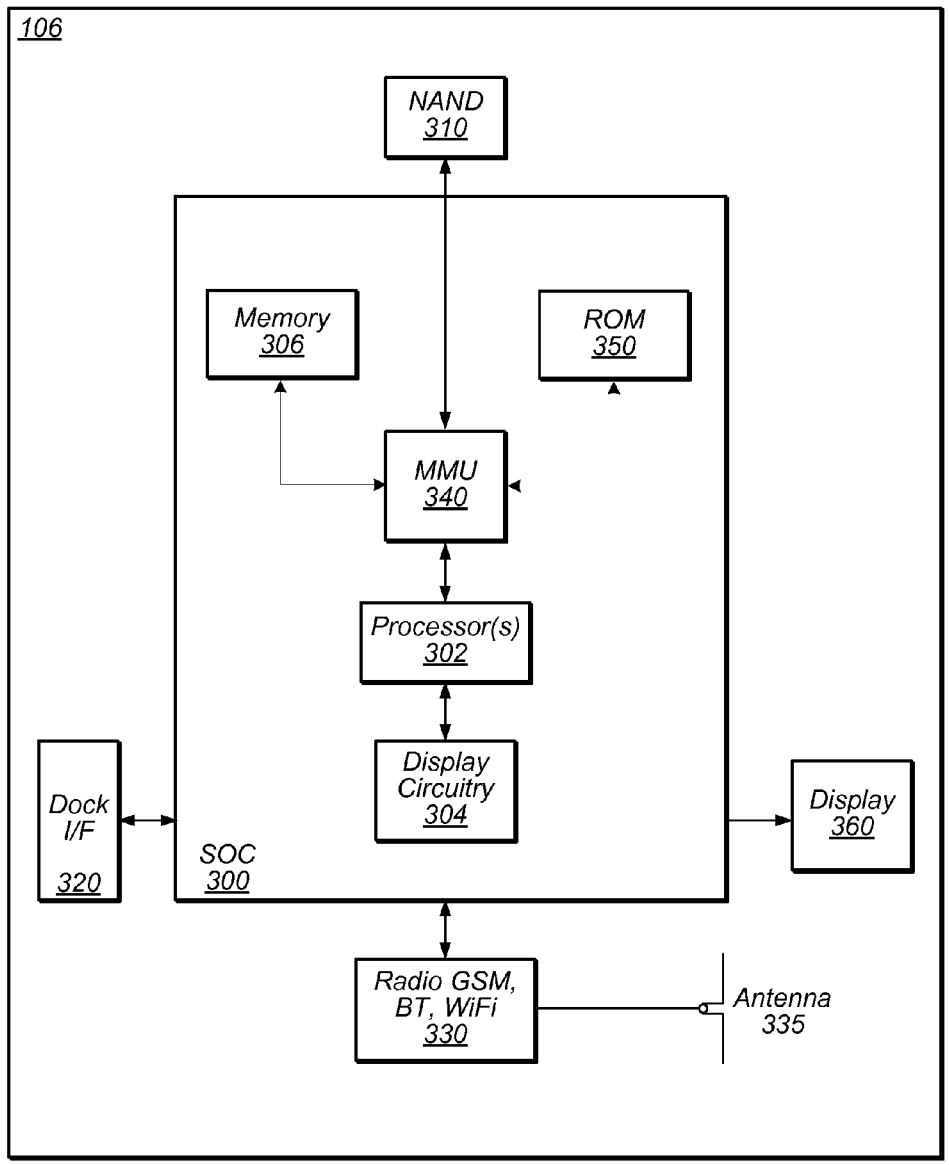
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, CDMA2000, Bluetooth, WiFi, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

Figure 5:
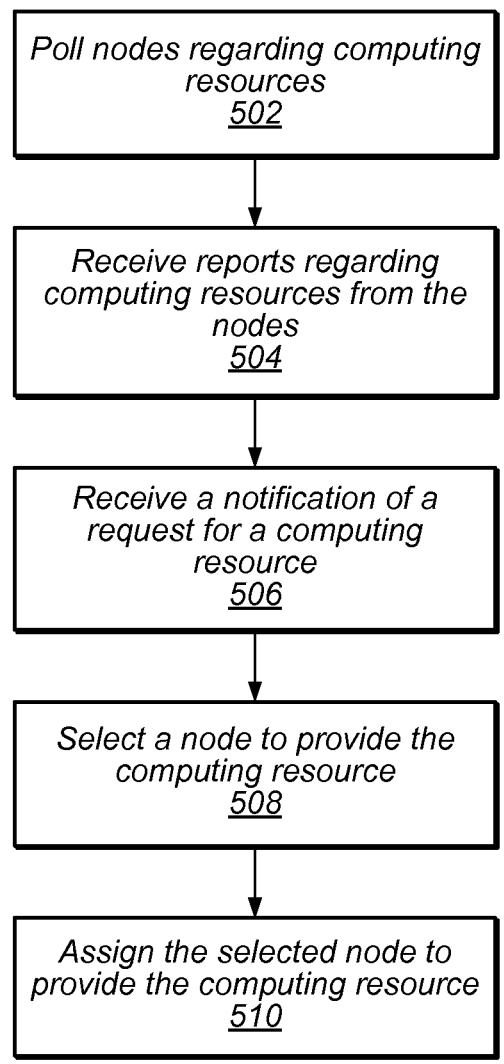
FIGS. 5-6 are flowchart diagrams illustrating methods for distributed computing in a wireless communication system according to one set of embodiments.
Figure 6:
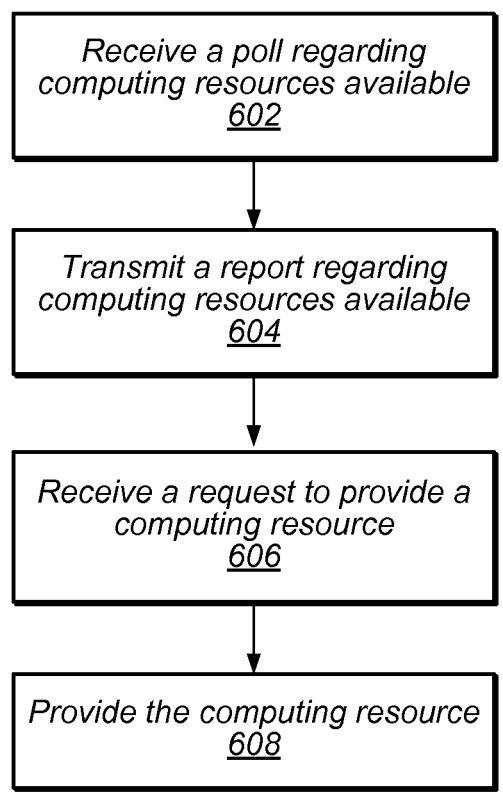

As described herein, the UE 106 may include hardware and software components for implementing distributed computing in a wireless communication system according to embodiments of this disclosure. FIGS. 5-6 and the description provided with respect thereto relate to some such methods according to various embodiments.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
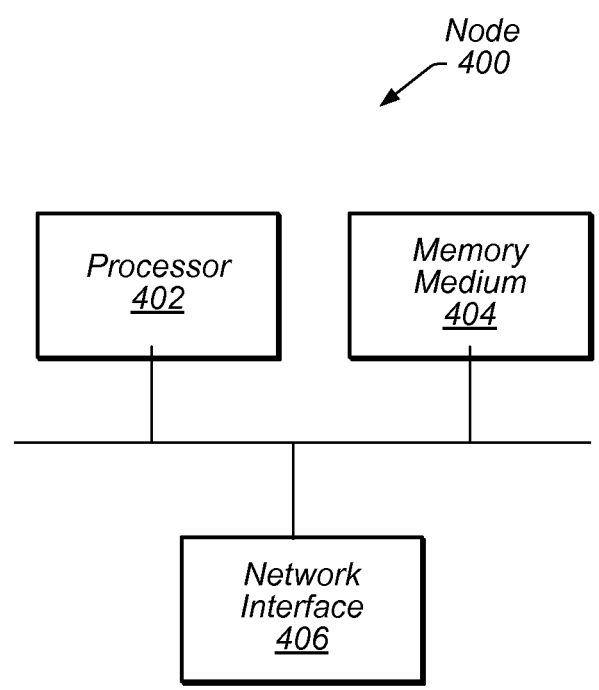
FIG. 4 illustrates an exemplary block diagram of a node in a wireless communication system, according to one embodiment.

FIG. 4—Exemplary Block Diagram of a Node

FIG. 4 illustrates an exemplary (simplified) block diagram of a node 400 which may be coupled to a wireless communication system. The node 400 may provide certain computing resources (e.g., processing capability provided by processor 402, storage capability provided by memory medium 404) and may be configured to communicate with other nodes via a network interface 406.

The processor 402 may be any of various types of processing units, having any of a variety of types of architectures, as desired. For example, processor 402 may be a general purpose processor configured to execute instructions from a memory medium, an ASIC, a programmable hardware element such as an FPGA or PLC, an embedded controller, and/or any of various other types of processing units. In some embodiments the node 400 may include multiple processors and/or processor cores, and/or may include a combination of multiple types of processors.

The memory medium 404 may include any of various types of memory devices or storage devices. For example, memory medium 404 may include a CD-ROM, floppy disk, tape device, DRAM, DDR RAM, SRAM, EDO RAM, Rambus RAM, Flash, magnetic media such as a hard drive or optical storage, registers or other similar types of memory elements, etc. The memory medium may include other types of memory as well as combinations thereof.

The network interface 406 may be any of various types of interfaces. For example, the network interface 406 may include one or more wired or wireless ports for communicating with other devices. The network interface 406, including the one or more ports, may provide the node 400 with the ability to communicate using one or more of Wi-Fi, GSM, UMTS, LTE, CDMA2000, Bluetooth, WiMAX, Ethernet, USB, FireWire, Broadband Over Powerline (BPL), and/or any of various other communication protocols.

The node 400 may also include any number of other elements, e.g., depending on the node's intended function, as desired. For example, the node 400 may include a display, one or more user input devices (e.g., mouse, keyboard, touch-pad and/or touch-screen), speaker(s) and/or microphone(s), one or more expansion buses, measurement hardware, etc.

The node 400 may be any of various types of nodes within the wireless communication system. For example, according to various embodiments, the node 400 may be a BS 102, a UE 106, a network appliance such as a router or gateway, a server computer system, a workstation, etc. The node 400 may also, e.g., based on what type of node it is, provide one or more functions within the wireless communication system. For example, BS 102 may provide wireless connectivity to UE 106 and other UEs in a certain geographic area, a server may host one or more network entities, a workstation may be used by an administrator to monitor network functionality, etc.

In some cases node 400 may provide multiple functions within the wireless communication system. For example, in some embodiments, node 400 may provide BS 102 functionality and may also host one or more network entities (e.g., a computing distribution entity or any other network entity).

Alternatively, node 400 may provide a single function, or may not have a dedicated function within the network. For example, node 400 may be provided within the wireless communication system as a general purpose computing resource which may be assigned various tasks by one or more other nodes and/or network entities. In some cases, even if node 400 has a dedicated function within the network, it may still be assigned various tasks by one or more other nodes and/or network entities according to embodiments of this disclosure. For example, if node 400 has available computing resources which are not being fully utilized, in some cases node 400 may be assigned to perform a processing task or otherwise provide a computing resource on behalf of another node within the wireless communication system according to embodiments of this disclosure.

FIGS. 5-6—Flowcharts

The increasing demand for wireless multimedia applications and Internet-based services has increased the complexity and power consumption of wireless user equipment (UE) devices' application processors and has required more processing power. For example, high-definition video streaming services, mapping applications (e.g., 3-D real-time mapping applications), multi-media real-time chat applications, complex interactive games, and other such applications and services may have significant processing requirements. Supporting such a range of high-quality applications and services on a UE 106 may be desirable, however, providing application processing capability for such applications and services in the UE 106 may have a negative impact on other potentially desirable features, such as, low cost, a small and lightweight form factor, and long battery life.

One possible solution is to share computing resources (e.g., processing, memory resources) of nodes which are communicatively coupled to the UE 106 (e.g., via a wireless communication system such as a cellular network, a Wi-Fi network, etc.) for data/application processing in the UE 106 in order to alleviate the need for more processing power at the UE 106. This may in turn reduce the overall complexity, cost, and power consumption of UEs 106, and may result in more efficient sharing of not only radio resources but also processing (and memory) resources in a network.

Providing distributed computing resources in a network may thus be expected to balance and make more efficient use of network application processing power and reduce the burden on UEs 106, and thus result in the same high-quality services and applications for mobile users without requiring higher application processing power at their UEs 106.

Accordingly, certain embodiments of the present disclosure relate to methods for distributed computing in a wireless communication system. FIGS. 5-6 are flowchart diagrams illustrating embodiments of such methods according to one set of embodiments. The methods shown in FIGS. 5-6 may be used in conjunction with any of the computer systems or devices shown in the above Figures, among other devices. In various embodiments, some of the method elements shown may be performed concurrently, in a different order than shown, or may be omitted. Additional method elements may also be performed as desired.

FIG. 5 relates, in particular, to a method for facilitating distributed computing and provision of computing resources in a wireless communication system. According to some embodiments, the method may be performed by a computing distribution node or entity (which may be a computer system, multiple computer systems, and/or software executing thereon) communicatively coupled to the wireless communication system. The computing distribution node may be a network entity in a cellular service provider's core network, according to some embodiments. The computing distribution node may be provided as a dedicated node or may be co-located with one or more other network entities such as a mobile management entity in LTE networks, according to various embodiments.

Note that in some embodiments, a network may include multiple computing distribution nodes. For example, computing distribution nodes may be provided on a regional basis, in which each respective computing distribution node tracks computing resources and responds to requests for computing resources according to embodiments of the method of FIG. 5 for network nodes within a certain physical and/or logical (e.g., communicative) distance from the respective computing distribution node. In such a case each computing distribution node may communicate with one or more other (e.g., neighboring) computing distribution nodes to provide effective and efficient computing resource distribution over the entire network.

In 502, the computing distribution node may poll nodes regarding computing resources. The computing distribution node may poll some or all nodes in the wireless communication system. The nodes polled may include access points, base stations, relay stations, femto base stations, other network elements, UEs, etc. The nodes may be communicatively coupled to the computing distribution node via one or more wired and/or wireless connections of any of a variety of types, including cellular wireless links (using various channels and/or protocols defined within a cellular communication standard), Wi-Fi wireless links, Ethernet links, etc.

Each node may have certain computing resources, such as one or more processors having a certain processing capacity, one or more memory media having a certain storage capacity, etc. According to some embodiments, the poll may request information from each node regarding the availability, amount, and/or type of computing resources available at each node.

In addition, each node may be coupled to the network in a particular way, based on which it may have certain networking characteristics (e.g., direct and indirect connections to other nodes, types of networking capabilities, qualities (e.g., bandwidth, latency, reliability, etc.) of network connection(s), etc.). In some embodiments, the poll may also request information from each node regarding one or more such networking characteristics.

In 504, reports regarding computing resources (and possibly networking characteristics) may be received from the nodes by the computing distribution node. The reports may be received from the nodes based on the polling performed by the computing distribution node in step 502. Alternatively, or in addition, in some embodiments, some or all nodes may provide reports regarding computing resources at those nodes without prompting. For example, in some embodiments, some or all nodes may be configured to periodically transmit a report on their computing resources to the computing distribution node, e.g., according to a schedule or some other trigger.

The reports may include information regarding availability, amount, and/or type of computing resources available at each node, and in some embodiments may include information from regarding one or more networking characteristics of each node. The information may be provided by the nodes in response to a poll, such as described above, or may be provided without external prompting according to some embodiments.

The computing distribution node may store the information regarding computing resources and/or networking characteristics of nodes in the wireless communication system. For example, according to one set of embodiments, the information may be stored in a database accessible to the computing distribution node, and possibly accessible to other computing distribution nodes in the network. Other forms of storage are also possible.

In some embodiments, the computing distribution node may provide information regarding computing resources and/or networking characteristics of nodes in the wireless communication system to one or more other computing distribution nodes in the wireless communication system, and/or receive information regarding computing resources and/or networking characteristics of nodes in the wireless communication system from one or more other computing distribution nodes in the wireless communication system. For example, in one set of embodiments, the wireless communication system may encompass a large geographic area (e.g., a nationwide cellular communication network) with numerous base stations (e.g., some networks may have 40,000-50,000 base stations), and so it may be desirable to provide multiple computing distribution nodes, e.g., distributed throughout the network on a more regional basis. In this case, it may further be desirable for at least neighboring computing distribution nodes to keep each other updated on the status of computing resources in the regions for which they are responsible for distributing computing tasks.

In 506, a notification of a request for a computing resource may be received. The request for a computing resource may originate from a UE 106. The notification of the request may be received from a base station. For example, the UE 106 may be provided with wireless communication services by a serving base station, which may receive the request from the UE 106 and notify the computing distribution node of the request.

The UE 106 may request any of a variety of types of computing resources, such as a processing resource (e.g., assistance with an application processing or data processing task), a memory resource (e.g., data storage), a combination of resources, or one or more other computing resources. The requested computing resource may be requested for use in conjunction with any of a variety of applications or services, according to various embodiments, which may be primarily locally-based applications or services, or may be primarily network-based applications or services. Some non-limiting examples of applications and services for which computing resources might be requested could include video streaming applications, mapping services, image and/or photo processing, graphics rendering (e.g., for 3D modeling and/or games), etc.

According to one set of embodiments, for example, the UE 106 may request processing of content which the UE 106 has requested and/or is receiving via the wireless communication system. In some such embodiments, the computing distribution node may be provided with a notification of a request for content originated from the UE 106. For example, in one set of embodiments, the UE 106 may initially request content from a content server (e.g., via a serving base station) and receive the content from the content server, via the wireless communication system. The computing distribution node may be informed of the request for content from the UE 106 (e.g., by the serving base station). A user of the UE 106 may then, e.g., while receiving the content, request further processing of the content. The computing distribution node may then be informed of the request for processing of the content from the UE 106. Alternatively, such a request for content processing may be provided by the UE 106 at the same time as (e.g., as part of) the request for content, in some embodiments.

Note that in some such embodiments, services and/or data (such as content provided by a content server) may be provided by entities or nodes which are outside of the wireless communication system. For example, according to one set of embodiments, the wireless communication system may include a cellular service provider's core network, base stations, and user equipment devices served by the cellular service provider's cellular network. The core network may provide a connection to other packet data networks (e.g., the Internet) which are external to the wireless communication system via one or more packet data network gateways. In such cases, requesting the content may include setting up an internet protocol (IP) connection, obtaining authorization for the UE 106 to receive the content, and/or one or more other procedures.

In some embodiments, the request for a computing resource may not be related to externally provided content or services, but may instead relate to applications or services local to the UE 106. For example, the UE 106 might request that remote data processing, application processing, data storage, etc., be provided for an application which is executing locally on the UE 106.

In 508, a node may be selected to provide the computing resource. The node may be selected according to any of a variety of algorithms, based on any of a number of factors. In some embodiments, the selection process may be based at least in part on information from nodes in the wireless communication system in the reports received in step 504. For example, the node might be selected from some or all of the nodes in the wireless communication system based on proximity of the node to the UE 106, characteristics of communication links between the node and the UE 106 (e.g., reliability, congestion, bandwidth, latency estimations, jitter estimations, etc.), quality of service requirements related to a service for which the requested computing resource will be utilized, and/or any number of other factors relating to the selected node and/or one or more other nodes in the wireless communication system.

According to various embodiments, the selected node may be any of various types of nodes, including base stations, mobile devices, relay stations, femto base stations, general purpose computers, and/or any of various other network elements. Note, however, that according to some embodiments, certain types of nodes may be subject to certain considerations and/or restrictions with respect to being assigned to provide a computing resource for another node.

For example, selecting a UE to provide a computing resource may have certain privacy, security, and/or other possible ramifications. Some possible such ramifications might include: content for which the requesting UE is authorized being be processed by a different UE which may not be authorized to receive the content; battery of a UE may be depleted by providing the computing resource, potentially negatively affecting user experience of a different subscriber; consent of users of UEs may be required before their UEs may be used to provide computing resources for other nodes in the wireless communication system; and other possible ramifications. These concerns, among other possible concerns, may be addressed in any of a variety of ways in order to include mobile devices as potential resources for providing computing resources, or alternatively, mobile devices may be excluded from a pool of available computing resources in the wireless communication system, as desired, according to various embodiments.

In 510, the selected node may be assigned to provide the computing resource. Assigning the selected node to provide the computing resource may include informing the selected node that it has been selected to provide the computing resource. One or more other nodes in the wireless communication system or external to the wireless communication system may also be informed of the assignment; which nodes are informed may depend on the nature of the request for a computing resource.

For example, if the request is for processing of content which originates from a content server which is external to the wireless communication system (e.g., a content server on the Internet), a request may be sent to the content server indicating to the content server to direct the content to the selected node. The selected node may then perform the processing and transmit the processed content to the UE 106 (possibly via one or more intervening nodes, such as a base station or access point which provides wireless service to the UE 106). Note that if the serving base station is the node selected to provide the computing resource, the processed content may in some embodiments be transmitted directly to the UE 106.

Alternatively, if the request is for an application processing or data processing task or for data storage originating from the UE 106 itself, the computing distribution node may inform the UE 106 which node has been selected to provide the computing resource. The UE 106 may then provide the data and/or task to be processed and/or stored to the selected node (possibly via one or more intervening nodes), which may then provide the requested computing resource, and transmit any results and/or an acknowledgement, if appropriate, to the UE 106 (again possibly via one or more intervening nodes).

Note that in some embodiments, use may advantageously be made in some embodiments of wireless peer-to-peer communication as part of the method of FIG. 5. In particular, according to some embodiments, if the node providing the computing resource is another mobile device within range for wireless peer-to-peer communication with the UE 106, the node may provide the result of providing the computing resource (e.g., processed content, acknowledgement, etc.) directly to the UE 106 via wireless peer-to-peer communication.

In some embodiments, the method may include further actions in response to changes in network conditions, routing strategies, and/or other parameters. For example, some or all of movement of nodes within the network (in particular including handover of the UE 106 from one base station to another base station), reliability and channel conditions over radio links, changes in workload/availability of nodes in the network), changes in network latency and congestion, termination or initiation of service of one or more nodes, etc., may be detected and/or notifications thereof may be received by the computing distribution node, based on which the computing distribution node may decide to modify one or more distributed computing task assignments.

Thus in some embodiments, based on such changes in network conditions (or other parameters), a requested computing resource may be re-assigned from one node to another node. In such a case, a request may be provided to the node to which the computing resource is re-assigned, indicating to that node to perform the requested processing. A request may also be provided to an entity (e.g., a content server, the UE 106, or another entity) providing data for use in conjunction with the requested computing resource, indicating to provide the data to the node to which the computing resource is re-assigned. In addition, in some embodiments, the node which previously provided the computing resource may be informed that it is no longer requested to provide the computing resource.

If the UE 106 is handed over from one base station to another base station, this may or may not affect which node provides the requested computing resource. In either case, a notification of the handover may be received (e.g., from the originally serving base station, from the newly serving base station, or from both base stations) by the computing distribution node. The computing distribution node may then provide an indication to the node which is providing the computing resource to send any result of providing the computing resource (e.g., processed content, acknowledgement, etc.) to the newly serving base station for transmission to the UE 106.

FIG. 6 relates, in particular, to a method for a node (such as node 400 illustrated in and described with respect to FIG. 4) to provide computing resources for a second node in a wireless communication system. The node may be an access point, base station, relay station, femto base station, UE, other network element, etc. in the wireless communication system, according to various embodiments. Accordingly, the node may be coupled to the wireless communication system via one or more wired and/or wireless communication links, e.g., depending on the type of node. For example, if the node is a mobile station such as UE 106, the node may be coupled to the wireless communication system by a cellular link with a base station, according to one set of embodiments. The base station may in turn be coupled to one or more other base stations and/or a core network via one or more wired and/or wireless links. Some nodes within the core network may be coupled directly to other nodes in the core network only by wired means, but may still be considered part of the wireless communication system, as they may indirectly be coupled to one or more other nodes in the wireless communication system via wireless means, e.g., via one or more base stations. Note that the node may transmit and receive requests, data, and other information to other nodes in the wireless communication system according to the method of FIG. 6 directly or indirectly, via a wireless link, a wired link, or a combination or multiple wireless and/or wired links.

Note that the method of FIG. 6 may be performed (e.g., by a node in the wireless communication system) in conjunction with performance (e.g., by a computing distribution node in the wireless communication system) of the method of FIG. 5, according to some embodiments.

In 602, a poll may be received regarding computing resources available at the node. The poll may be received from a computing distribution node in the wireless communication system, according to some embodiments. According to some embodiments, the poll may request information from the node regarding the availability, amount, and/or type of computing resources available at the node. In some embodiments, the poll may also request information from the node regarding one or more networking characteristics of the node.

In 604, a report may be transmitted to the computing distribution node regarding computing resources available at the node. The report may be transmitted based on the poll received by the node in step 602, in some embodiments. Alternatively, the report may be provided without external prompting, for example according to an internal schedule kept by the node, according to some embodiments. The reports may include information regarding availability, amount, and/or type of computing resources available at each node, and in some embodiments may include information from regarding one or more networking characteristics of each node.

Note that in some embodiments, step 604 (and possibly step 602) may be performed repeatedly, e.g., in order to provide the computing distribution node with an up-to-date status of the computing resources available at the node.

In 606, a request to provide a computing resource may be received. The computing resource may be requested on behalf of a second node in the wireless communication system, such as a UE 106. The request may be for any of a variety of types of computing resources, such as a processing resource (e.g., assistance with an application processing or data processing task), a memory resource (e.g., data storage), a combination of resources, or one or more other computing resources. The requested computing resource may be requested for use in conjunction with any of a variety of applications or services, according to various embodiments, which may be primarily locally-based applications or services, or may be primarily network-based applications or services. Some non-limiting examples of applications and services for which computing resources might be requested could include video streaming applications, mapping services, image and/or photo processing, graphics rendering (e.g., for 3D modeling and/or games), etc.

In 608, the node may provide the requested computing resource. Depending on the type of computing resource requested, data may be received by the node. The data may be for use in providing the computing resource. For example, the data may be content or application data for which processing has been requested or for which storage may be requested. The data may be received from the second node or from another node. In some embodiments, the data may be received from a source which is external to the wireless communication system, such as a content server on the Internet.

Providing the computing resource may then include processing the data in a requested manner (e.g., post processing of content such as video stream content, sorting or analysis of data such as database data, storage of user content such as music, video files, etc.).

Again depending on the computing resource provided, the node may provide results of provision of the computing resource to the second node. For example, if the request is for processing of content, the node may provide the second node with the processed content. Alternatively (e.g., for storage resources), no results may be provided to the second node, though an acknowledgement that the computing resource is being provided may be provided to the second node if desired, according to some embodiments.

It should be noted that the effectiveness of the methods of FIGS. 5-6 may depend significantly on the characteristics of communication links (e.g., radio and backhaul links, etc.) in the wireless communication system. For example, in order to effectively implement the methods of FIGS. 5-6, according to some embodiments the wireless communication system may need to feature low transmission/transport delay, high data rate, high reliability and robustness (i.e., very low probability of bit and packet errors) as well as efficiency of the over the air and over the access or core network signaling protocols.

The exact requirements may vary depending on the demands of the applications and services for which it is desired to provide distributed computing resources. For example, some applications and services may be more suitable for utilizing distributed computing resources via a wireless communication network than others. According to some embodiments, the computing distribution node may determine whether a request for a computing resource may be granted, e.g., depending on the delay tolerance of the application or service for which the computing resource is requested and the characteristics of the wireless communication system, and possibly more specifically of nodes within the wireless communication system. For example, according to one set of embodiments, an estimated delay between receiving request for a computing resource and provision of that computing resource may be compared with a maximum delay tolerance of an application or service for which the computing resource is requested, based on which it may be determined whether the computing resource can be provided by another node within the wireless communication system while meeting the requirements of the application or service for which the computing resource is requested.

Thus, at least according to some embodiments, applications which are less delay sensitive, such as video streaming services for which data can be transmitted in advance of presentation and buffered until presentation, may have lower demands in terms of transmission time, and may thus have a significant capability to advantageously use such methods for distributed computing in a wireless communication system. Applications which are particularly delay sensitive, such as voice chat and other real-time voice applications, may have higher demands in terms of minimizing transmission times, and thus may be less innately suited to taking advantage of such methods. However, such applications may still advantageously use such methods, e.g., depending on the characteristics of the wireless communication system and the applications themselves, if desired.

Figure 7:
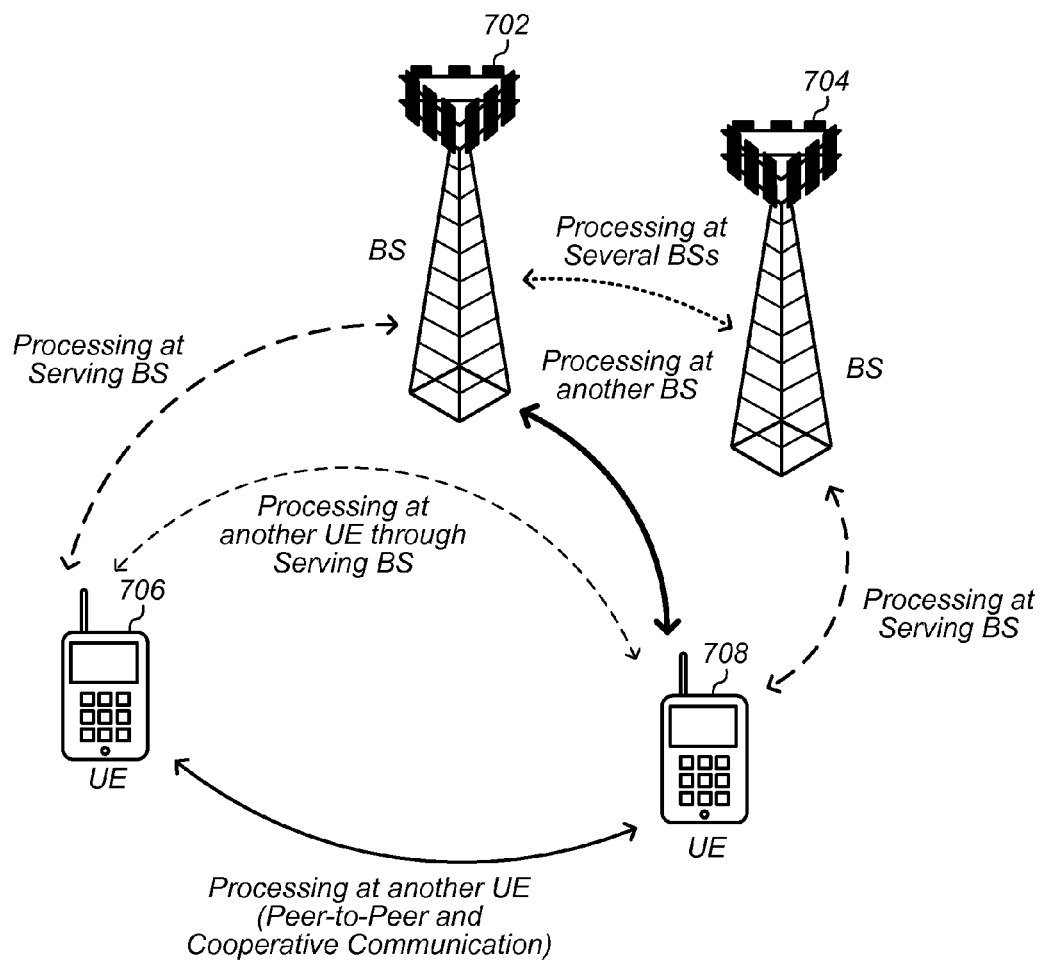
FIGS. 7-8 illustrate parts of an exemplary cellular network in which distributed computing may be implemented according to one set of embodiments.

FIG. 7—Distributed Computing in a Cellular Network

FIG. 7 illustrates various possibilities for distributed computing in an exemplary cellular network including BSs 702, 704, and UEs 708, 708. Those of skill in the art will recognize that the illustrated system and the description thereof provided hereinbelow are provided by way of example as one possible system in which the methods of FIGS. 5-6 may be implemented according to one set of embodiments, and that numerous alternatives and variations thereto are also possible.

In the illustrated network, UE 706 is provided with cellular service, including a communicative connection to the cellular service provider's core network, by BS 702. Similarly, UE 708 is provided with cellular service by BS 704.

Consider that the UE 706 may request some type of processing, such as processing of content from a content server. A computing distribution node within the network may assign another node in the network to provide the processing. The node selected may of course depend on any number of factors according to various embodiments, but at least in some embodiments may preferably be a node which is relatively near to the UE 706. Thus one likely possibility is that the BS 702, which is the serving base station for UE 706, may also provide the requested processing. Alternatively, the processing may be assigned to and performed by another base station, such as BS 704, or a combination or multiple base stations, such as both of BS 702 and BS 704. In this case, processed content may be provided by the non-serving BS 704 to serving BS 702 and thence to UE 706. Another alternative may include assigning the processing to another mobile device, such as UE 708. In this case, the processed content may be provided from UE 708 to UE 706 indirectly via one or more base stations (e.g., BS 704, as serving BS to UE 708, and BS 702, as serving BS to UE 706, or in some embodiments may be provided directly via peer-to-peer communication.

Similar possibilities exist if UE 708 requests a computing resource. The computing resource may be provided by one or more of serving BS 704, non-serving BS 702, UE 706, and/or one or more other nodes (not shown) in the cellular network.

Figure 8:
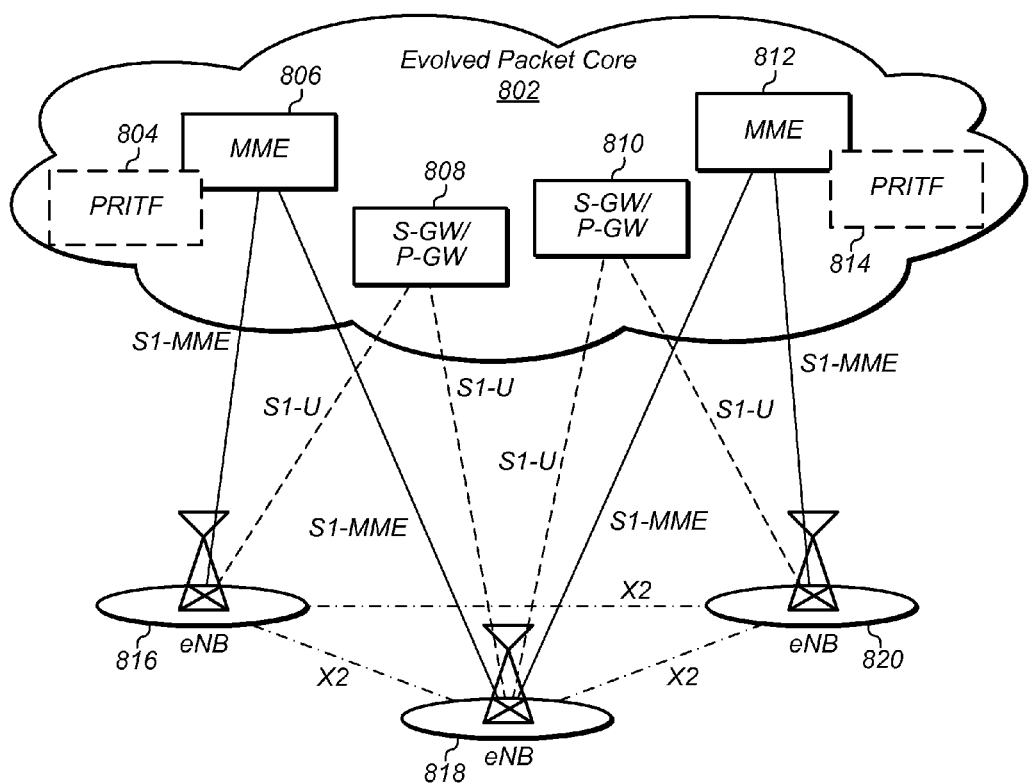

FIG. 8—Exemplary LTE Implementation

FIG. 8 illustrates a core network, including multiple computing distribution entities, in communication with various base stations, according to an exemplary LTE implementation. Note that FIG. 8 and the following description provided with respect thereto are provided by way of example as illustrating aspects of one possible wireless communication system in which the methods of FIGS. 5-6 may be implemented, but it will be recognized that numerous variations and alternatives thereto are also possible and should be considered within the scope of this disclosure. Accordingly, FIG. 8 and the following description provided with respect thereto should not be considered limiting to the disclosure as a whole.

As shown, various network entities such as mobile management entities (MMEs) 806, 812 and serving gateways (S-GWs)/packet data network gateways (P-GWs) 808, 810 may reside in the evolved packet core (EPC) 802 (which may function as the core network in LTE). In the illustrated embodiment the MMEs 806, 812 may also each include a Processing Resource/Node Identification and Tracking Functions (PRITFs) 804, 814, which may function as computing distribution entities.

The network entities in the EPC 802 may be in communication with eNBs 816, 818, 820 (which may function as base stations in LTE), and the eNBs 816, 818, 820 may be in communication with each other, via various LTE-defined signaling mechanisms such as S1 and X2. The eNBs may further be in communication with subscriber UEs (such as UEs 706, 708 illustrated in FIG. 7) via LTE-defined communication channels.

The PRITFs 804, 814 may operate in conjunction with the other network entities, base stations, subscriber devices, and each other to facilitate distribution of computing resources within the wireless communication system, such as according to the methods of FIGS. 5-6, according to various embodiments.

Figure 9:
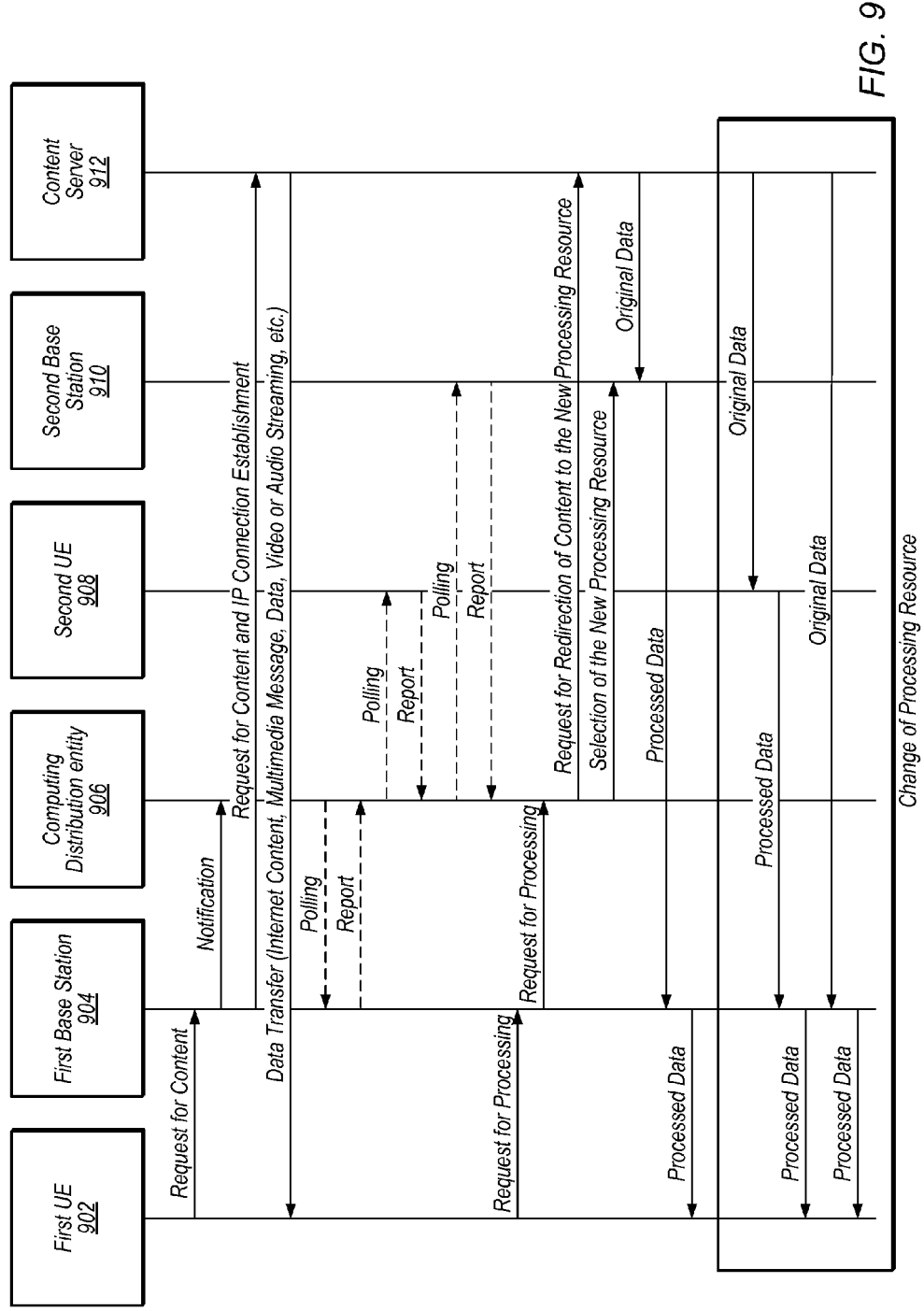
FIG. 9 is a signaling diagram illustrating signaling flow between nodes in a wireless communication system implementing distributed computing according to one set of embodiments.

FIG. 9—Communication Diagram

FIG. 9 is a diagram illustrating an exemplary communication flow in a wireless communication system 900 supporting distributed computing according to one set of embodiments. According to some embodiments, the wireless communication system 900 of FIG. 9 may be implemented in conjunction with the systems of FIGS. 7-8 and 10. For example, according to one set of embodiments, the wireless communication system 900 may include a core network (such as EPC 802 illustrated in FIG. 8), a set of base stations and/or access points (such as eNBs 816, 818, 820 illustrated in FIG. 8 or BSs 702, 704 illustrated in FIG. 7) communicatively coupled to the core network, and any UEs (such as UEs 706, 708 illustrated in FIG. 7) served by those base stations and/or access points. Other wireless communication systems are also possible.

FIG. 9 and the following description provided with respect thereto are provided by way of example as one possible way of implementing the methods of FIGS. 5-6, but it will be recognized that numerous variations and alternatives thereto are also possible and should be considered within the scope of this disclosure. Accordingly, FIG. 9 and the following description provided with respect thereto should not be considered limiting to the disclosure as a whole.

As shown, there may be a first UE 902, a first base station 904 which serves the first UE 902, a computing distribution entity 906, a second UE 908, a second base station 910, and a content server 912. The first base station 904 may provide a wireless communication link to the first UE 902. The first base station 904 may also be coupled to a service provider's core network, via wired and/or wireless communication links. The computing distribution entity 906 may be part of the service provider's core network. The second base station 910 may also be coupled to the core network via wired and/or wireless communication links in a similar manner as the first base station 904. The second UE 908 may be served by the second base station 910, the first base station 904, or another base station (not shown), according to various embodiments. Thus each of the first UE 902 and the second UE 908 may be communicatively coupled to the core network via serving base stations. The content server 912 may be external to the core network; for example, the content server 912 may be an Internet server, which may be accessed by entities in the core network via a packet data network gateway (P-GW) such as S-GW/P-GWs 810, 812 illustrated in FIG. 8.

The first UE 902 may request content. The content may be any of a variety of types of content, including Internet content, a multimedia message, data, streaming video or audio, etc. The request for content may be transmitted by the first UE 902 to the first base station 904.

The first base station 904 may notify the computing distribution entity 906 of the request by the first UE 902 for content. The first base station 904 may also provide the computing distribution entity 906 with information regarding the device capabilities of UE 902. The first base station 904 may also request the content from the content server 912. Since the content server may be external to the core network, in some embodiments the first base station 904 may also set up an IP connection with the content server 912 and possibly also perform or facilitate authentication or other procedures for establishing that the UE 902 has permission to receive the requested content. Once any necessary connections and permissions have been authorized and established, the content server 912 may provide the requested content to the first UE 902, e.g., via the first base station 904.

The computing distribution entity 906 may poll some or all of the nodes in the wireless communication system. In particular, as illustrated in FIG. 9, the computing distribution entity 906 may poll the first base station 904, the second base station 910, and the second UE 908. Other nodes (not shown) may also be polled. The polls may request information regarding availability, amount, and type of computing resources (e.g., processing resources, memory resources) at each node. Each respective polled node may respond to a poll with a report on the availability, amount, and type of computing resources at the respective node. The polls and reports may be transmitted relatively frequently, or at least from time to time, such that the computing distribution entity 906 may have high-quality, up-to-date computing resource availability information with which to make decisions relating to computing task assignments. According to various embodiments, the polls and/or reports may be transmitted on a periodic (regularly) or aperiodic (irregularly) basis, as desired. In some embodiments, nodes may be configured to transmit reports to the computing distribution entity 906 without prompting (e.g., without receiving a poll requesting the reports) on a regular or irregular basis. The frequency of polling and/or reports may depend on services provided for/by various nodes, network deployment, and congestion, and may be adaptively configured, e.g., to avoid unnecessary overhead, according to some embodiments.

Note that computing distribution functionality may be centralized (e.g., performed by a single computing distribution entity 906) or distributed (e.g., performed by multiple computing distribution entities), e.g., depending on network deployment, maximum tolerable signaling delay and other quality of service (QoS) requirements specific to services provided via the wireless communication system, and/or as desired. In the case of multiple computing distribution entities, the computing distribution entities may be coordinated such that a computing resource inventory (e.g., based on polls/reports from nodes in the wireless communication system) may be shared between computing distribution entities to enable efficient use of all network resources.

After receiving the content, a request may be made by the first UE 902 for processing of the content. For example, a user of the first UE 902 may decide that some type of post-processing of the content would be desirable, and request the desired post-processing. Alternatively, the first UE 902 (e.g., an application executing on the first UE 902) may determine that additional processing of the content is desirable, and may thus request the additional processing. The request may be provided to the first base station 904. The first base station 904 may in turn notify the computing distribution entity 906 of the request for processing from the first UE 902.

The computing distribution node 906 may then select a node to perform the requested processing. Selecting a node may be performed according to any of a variety of techniques and may consider any of a number of factors, according to various embodiments. Some examples of possible variables which might form part or all of the basis for selecting a node may include the availability, type, and amount of computing resources at various nodes in the wireless communication system, proximity (physical and/or logical) of the various nodes to the first UE 902, reliability and congestion of the radio and/or network links between the various nodes and the first UE 902, bandwidth of the radio and/or network links between the various nodes and the first UE 902, QoS requirements of the service for which the processing is being provided, latency and jitter estimations over the radio and/or network links between the various nodes and the first UE 902, and/or other factors.

The computing distribution node 906 may request that the content server 912 redirect the content to the selected node. The computing distribution node 906 may also inform the selected node that it is being assigned to provide the requested processing. In the exemplary embodiment illustrated in FIG. 9, the second base station 910 is selected to provide the processing. Accordingly, the content server 912 may send the content to the second base station 910, which may process the content as requested. The second base station 910 may then transmit the processed content to the first UE 902, via the first base station 904. The first UE 902 may then present the processed content, at least in some embodiments.

It will readily be recognized that network conditions may be subject to considerable variability in a wireless communication system. For example, nodes may frequently enter and exit the wireless communication system; communication links may be formed, modified, and lost; traffic patterns, resource availability, channel conditions, and other factors may undergo rapid changes, among other possible sources of variability. Accordingly, it may under some circumstances be desirable to re-assign a computing task to a different node.

For example, as shown in FIG. 9, processing of the content may be re-assigned to the second UE 908 at a subsequent time. In this case the computing distribution entity 906 may request that the content server 912 re-direct the content to the second UE 908 (possibly via a serving base station). The computing distribution entity 906 may also send an indication or request to the second UE 908 that the second UE 908 perform the processing, and possibly also an indication to the second base station 910 that it is no longer requested to perform the processing. As a result, the content server 912 may send the content to the second UE 908 (possibly via a serving base station), which may process the content and transmit the processed content to the first UE 902 via the first base station 904 (and possibly via a serving base station, if different than the first base station 904). Alternatively, the second UE 908 may transmit the processed content to the first UE 902 via peer-to-peer wireless communication, according to some embodiments.

Similarly, processing of the content may be re-assigned to the first base station 904 at a subsequent time, according to some embodiments. In this case the computing distribution entity 906 may request that the content server 912 re-direct the content to the first base station 904. The computing distribution entity 906 may also send an indication or request to the first base station 904 that the first base station 904 perform the processing, and possibly also an indication to the second UE 908 that it is no longer requested to perform the processing. As a result, the content server 912 may send the content to the first base station 904, which may process the content and transmit the processed content to the first UE 902.

Note also that in some embodiments, the first UE 902 may move within the wireless communication system. For example, the first UE 902 may move from the service area of the first base station 904 to a service area of another base station, which may result in handover of the first UE 902. In this case, the first base station 904 and/or the destination base station may indicate to the computing distribution entity 906 that the first UE 902 is being handed over. The computing distribution entity 906 may in turn determine whether or not to re-assign the processing task to another node, and notify the content server 912 and/or any affected nodes to redirect transmissions as appropriate as a result of the change in serving base station for the first UE 902. Tracking area updates and/or location updates from the UE 902 may help the computing distribution node 906 and/or other network entities to prepare for such redirection of the data path and may reduce the signaling latency due to path switching and signaling.

It should be noted that the effectiveness of the method of FIG. 9 may depend significantly on the characteristics of communication links (e.g., radio and backhaul links, etc.) in terms of low transmission/transport delay, high data rate, high reliability and robustness (i.e., very low probability of bit and packet errors) as well as efficiency of the over the air and over the access or core network signaling protocols. According to one set of embodiments, a maximum total delay following a request for processing of data/content from the UE 902 until the UE 902 receives the processed data/content may be defined and used in determining whether a request for processing of data/content may be distributed to another node in the wireless communication system. For example, according to one set of embodiments, satisfaction of the following constraint may be required to distribute a computing task to a particular node:

$$T_{Total\text{-}Delay} \leq \text{Application\_Maximum\_Tolerable\_Delay}$$

where:

$$T_{Total\text{-}Delay} = T_{UE\text{-}BS} + T_{BS\text{-}Processing} + T_{BS\text{-}CDN} + \\ T_{CDN\text{-}Processing} + T_{CDN\text{-}Content\_Server} + \\ T_{Content\_Server\text{-}Processing} + \\ T_{Content\_Server\text{-}Processing\_Node} + \\ T_{Processing\_Node\text{-}Processing} + T_{Processing\_Node\text{-}BS} + \\ T_{BS\text{-}UE}$$

in which:

$T_{UE\text{-}BS}$: Uplink (airlink) transmission latency
$T_{BS\text{-}Processing}$: BS processing time
$T_{BS\text{-}CDN}$: BS to computing distribution node transport latency
$T_{CDN\text{-}Processing}$: Computing distribution node processing time
$T_{CDN\text{-}Content\_Server}$: Computing distribution node to content server transport latency
$T_{Content\_Server\text{-}Processing}$: Content server processing time
$T_{Content\_Server\text{-}Processing\_Node}$: Content server to processing node transmission latency
$T_{Processing\_Node\text{-}Processing}$: Processing node processing time
$T_{Processing\_Node\text{-}BS}$: Processing node to BS transport latency
$T_{BS\text{-}UE}$: Downlink (airlink) transmission latency
and where Application_Maximum_Tolerable_Delay is defined as part of the QoS requirements of the application or service for which the processing is requested.

Figure 10:
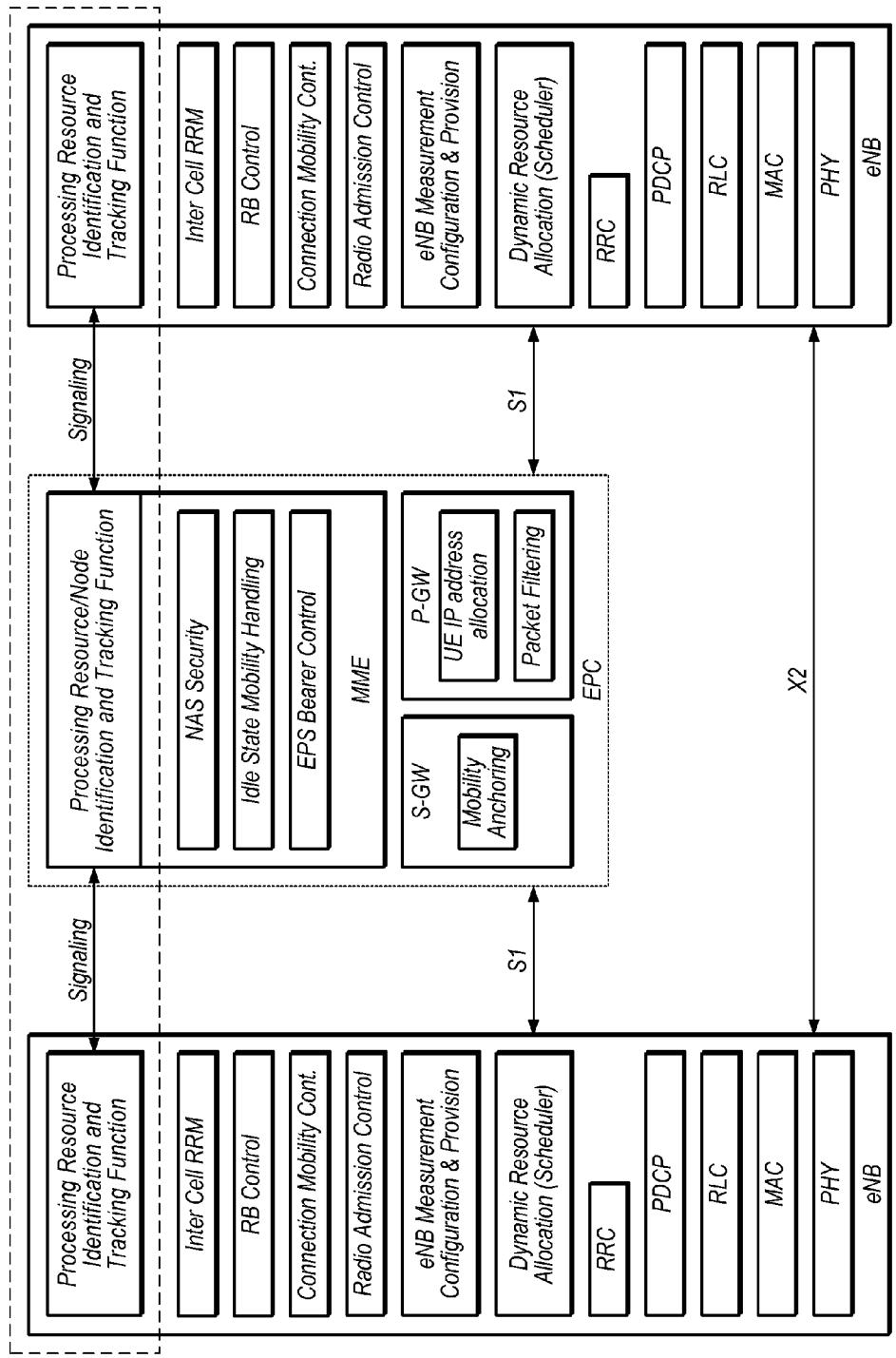
FIG. 10 is a diagram illustrating exemplary signaling and protocols of an exemplary wireless communication implementing distributed computing according to one set of embodiments.

FIG. 10—Exemplary LTE Signaling and Protocols

FIG. 10 is a diagram illustrating signaling and protocols of an exemplary LTE implementation including computing distribution entities according to one set of embodiments. As shown, the LTE wireless communication system may include base stations (eNBs) and a core network (EPC).

According to the illustrated embodiment, a Processing Resource/Node Identification and Tracking Function (PRITF) entity may act as the processing distribution entity. The PRITF may be implemented as part of the mobile management entity (MME) in the EPC. PRITF entities may also exist in each eNB, and may have their own signaling and protocol defined for communicating with each other, in addition to existing S1 signaling between eNBs and the EPC and X2 signaling between eNBs. The PRITFs may cooperatively function to monitor availability of computing resources within the LTE system and assign distributed computing tasks within the LTE system, such as described herein according to various embodiments. As shown, other aspects of the eNBs and EPC may operate according to existing LTE specifications.

Note that the exemplary illustration shown in FIG. 10 is provided as a non-limiting example of one possible way of implementing computing distribution entities in a wireless communication system, and other ways of implementing distributed computing, both in LTE and in other wireless communication systems, are also possible.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A wireless user equipment (UE) device acting as a first node in a wireless communication system, the UE comprising:
a radio; and
a processing element;
wherein the radio and the processing element are configured to:
send information regarding computing resources at the first node to a computing distribution node;
receive a request to provide a computing resource for a second node in the wireless communication system from the computing distribution node; and
provide the requested computing resource for the second node, wherein the second node is a wireless device in the wireless communication system, wherein providing the requested computing resource for the second node comprises providing the requested computing resource for the second node at least partially via a peer-to-peer wireless link between the first node and the second node.

2. The UE of claim 1, wherein the radio and the processing element are further configured to:
receive a request for the information regarding computing resources at the first node from the computing distribution node; and
send the information regarding computing resources at the first node to the computing distribution node in response to the request for the information regarding computing resources at the first node.

3. The UE of claim 1, wherein the information regarding computing resources indicates availability, amount, and type of computing resources at the first node.

4. The UE of claim 1, wherein the requested computing resource comprises processing of content for the second node, wherein to provide the requested computing resource, the radio and the processing element are further configured to:
receive the content;
perform the requested processing of the content to produce processed content; and
transmit the processed content to the second node.

5. The UE of claim 1,
wherein the wireless communication comprises a cellular communication system.

6. A method for operating a wireless user equipment (UE) device acting as a first node in a wireless communication system, comprising:
sending information regarding computing resources at the first node to a computing distribution node;
receiving a request to provide a computing resource for a second node in the wireless communication system from the computing distribution node; and
providing the requested computing resource for the second node, wherein the second node is a wireless device in the wireless communication system, wherein providing the requested computing resource for the second node comprises providing the requested computing resource for the second node at least partially via a peer-to-peer wireless link between the first node and the second node.

7. The method of claim 6, further comprising:
receiving a request for the information regarding computing resources at the first node from the computing distribution node;
wherein said sending the information regarding computing resources at the first node to the computing distribution node is performed in response to the request for the information regarding computing resources at the first node.

8. The method of claim 6, wherein the information regarding computing resources indicates availability, amount, and type of computing resources at the first node.

9. The method of claim 6, wherein the requested computing resource comprises processing of content for the second node, wherein providing the requested computing resource comprises:
receiving the content;
performing the requested processing of the content to produce processed content; and
transmitting the processed content to the second node.

10. The method of claim 6, wherein the wireless communication comprises a cellular communication system.

11. A wireless user equipment (UE) device acting as a first node in a wireless communication system, the UE comprising:
a radio; and
a processing element;
wherein the radio and the processing element are configured to:
send information regarding computing resources at the first node to a computing distribution node;
receive a request to provide a computing resource for a second node in the wireless communication system from the computing distribution node; and
provide the requested computing resource for the second node, wherein the second node is a wireless device in the wireless communication system, wherein providing the requested computing resource for the second node comprises providing the requested computing resource for the second node at least partially via an infrastructure mode wireless link between the first node and a base station.

12. The UE of claim 11, wherein the radio and the processing element are further configured to:
receive a request for the information regarding computing resources at the first node from the computing distribution node; and send the information regarding computing resources at the first node to the computing distribution node in response to the request for the information regarding computing resources at the first node.

13. The UE of claim 11, wherein the information regarding computing resources indicates availability, amount, and type of computing resources at the first node.

14. The UE of claim 11, wherein the requested computing resource comprises processing of content for the second node, wherein to provide the requested computing resource, the radio and the processing element are further configured to:
receive the content;
perform the requested processing of the content to produce processed content; and
transmit the processed content to the second node.

15. The UE of claim 11,
wherein the wireless communication comprises a cellular communication system.

16. A method for operating a wireless user equipment (UE) device acting as a first node in a wireless communication system, comprising:
sending information regarding computing resources at the first node to a computing distribution node;
receiving a request to provide a computing resource for a second node in the wireless communication system from the computing distribution node; and
providing the requested computing resource for the second node, wherein the second node is a wireless device in the wireless communication system, wherein providing the requested computing resource for the second node comprises providing the requested computing resource for the second node at least partially via an infrastructure mode wireless link between the first node and a base station.

17. The method of claim 16, further comprising:
receiving a request for the information regarding computing resources at the first node from the computing distribution node;
wherein said sending the information regarding computing resources at the first node to the computing distribution node is performed in response to the request for the information regarding computing resources at the first node.

18. The method of claim 16, wherein the information regarding computing resources indicates availability, amount, and type of computing resources at the first node.

19. The method of claim 16, wherein the requested computing resource comprises processing of content for the second node, wherein providing the requested computing resource comprises:
receiving the content;
performing the requested processing of the content to produce processed content; and
transmitting the processed content to the second node.

20. The method of claim 16, wherein the wireless communication comprises a cellular communication system.

* * * * *